(12) United States Patent
Schlamp et al.

(10) Patent No.: US 9,664,274 B2
(45) Date of Patent: May 30, 2017

(54) PLANETARY ASSEMBLY WITH A CAPTIVE CLUTCH

(71) Applicant: 1215089 Alberta Ltd., Edmonton (CA)

(72) Inventors: Brad Schlamp, Edmonton (CA); Blair Sware, Edmonton (CA)

(73) Assignee: 1215089 Alberta Ltd. (CA)

( * ) Notice: Subject to any disclaimer, the term of this patent is extended or adjusted under 35 U.S.C. 154(b) by 0 days.

(21) Appl. No.: 14/978,176

(22) Filed: Dec. 22, 2015

(65) Prior Publication Data

US 2016/0252175 A1      Sep. 1, 2016

Related U.S. Application Data

(60) Provisional application No. 62/095,606, filed on Dec. 22, 2014.

(51) Int. Cl.
    *F16H 57/08*      (2006.01)

(52) U.S. Cl.
    CPC ....... *F16H 57/08* (2013.01); *F16H 2057/087* (2013.01)

(58) Field of Classification Search
None
See application file for complete search history.

(56) References Cited

U.S. PATENT DOCUMENTS 6,824,494 B2 * 11/2004 Yasuda ............... F16H 63/3026
                                                475/315
6,869,380 B2 * 3/2005 Oberstarr ............. B60K 17/046
                                                475/311

* cited by examiner

*Primary Examiner* — Dirk Wright
(74) *Attorney, Agent, or Firm* — Scott T. Griggs; Griggs Bergen LLP

(57) ABSTRACT

A planetary assembly, including a base and a top portion supporting a plurality of planetary gears, said gears extending outwardly over a portion of the base; one or more pairs of alternating steel discs and friction discs extending upwardly on the base below the plurality of gears; wherein each of the steel discs and friction discs have a plurality of indentations corresponding to the plurality of gears, the indentations aligned and sized to allow movement of the steel discs and friction discs above the plurality of gears.

8 Claims, 6 Drawing Sheets

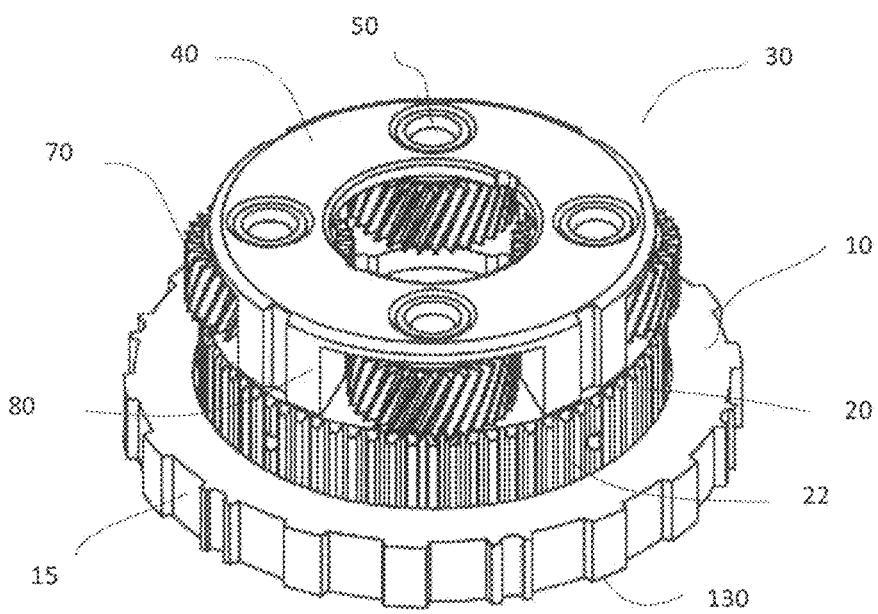
FIG. 1
Prior Art
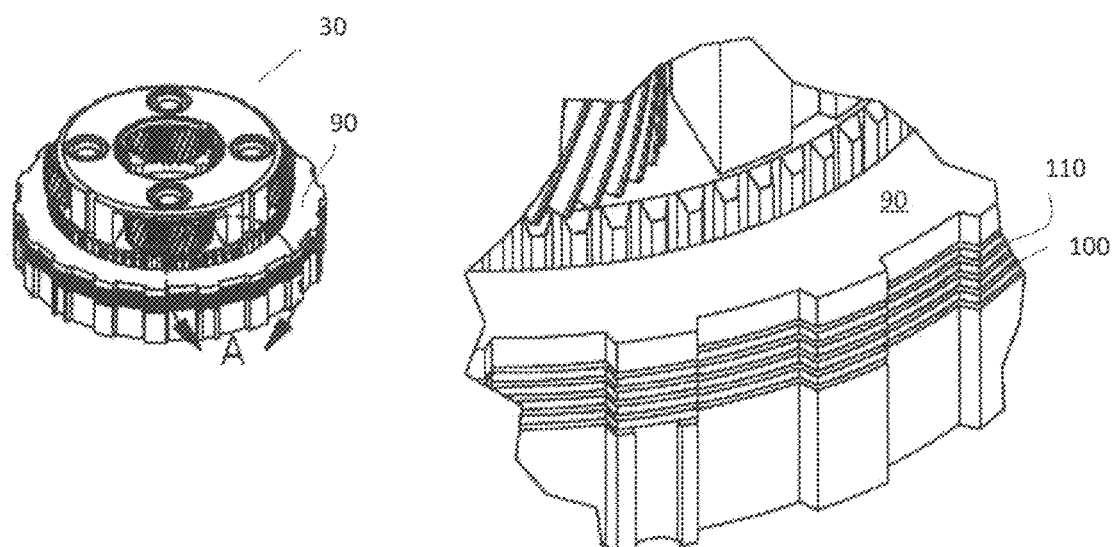
FIG. 2A
Prior Art
DETAIL A
FIG. 2B
Prior Art

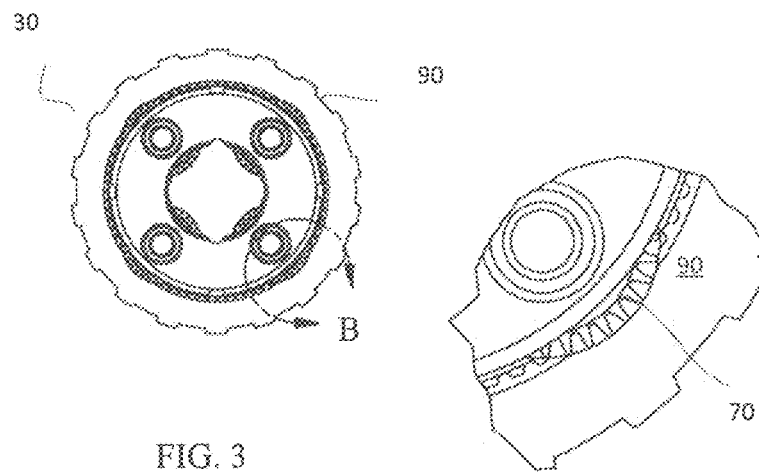
FIG. 3
Prior Art
DETAIL B
FIG. 3B
Prior Art
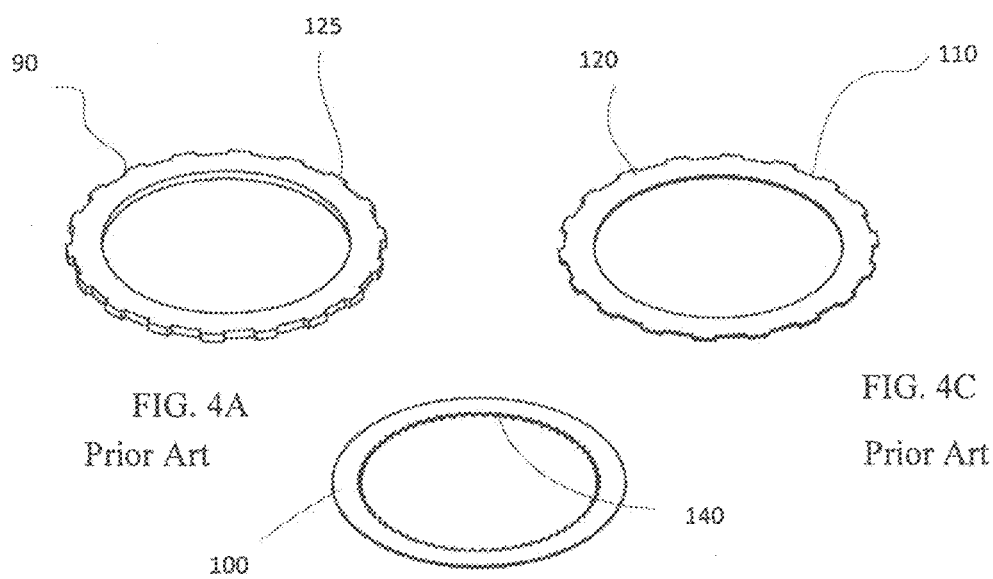
FIG. 4A
Prior Art
FIG. 4B
Prior Art
FIG. 4C
Prior Art

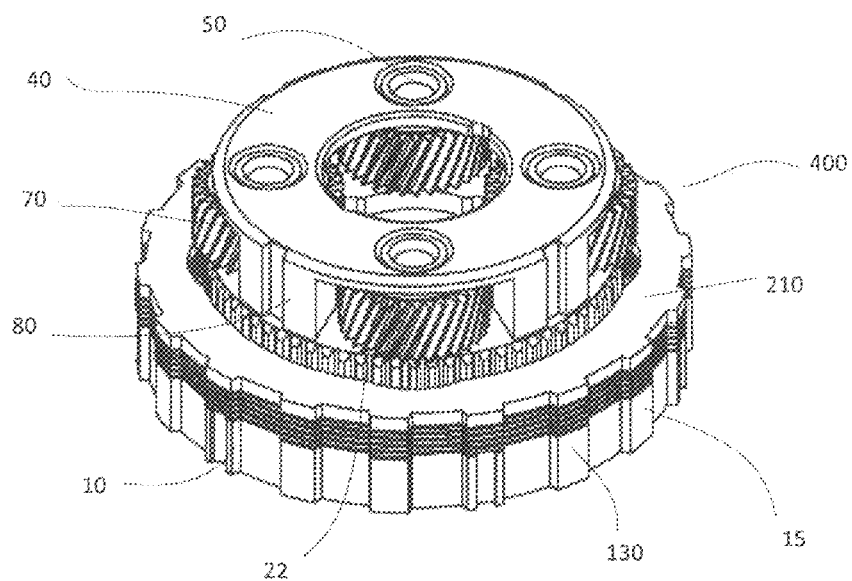
FIG. 5
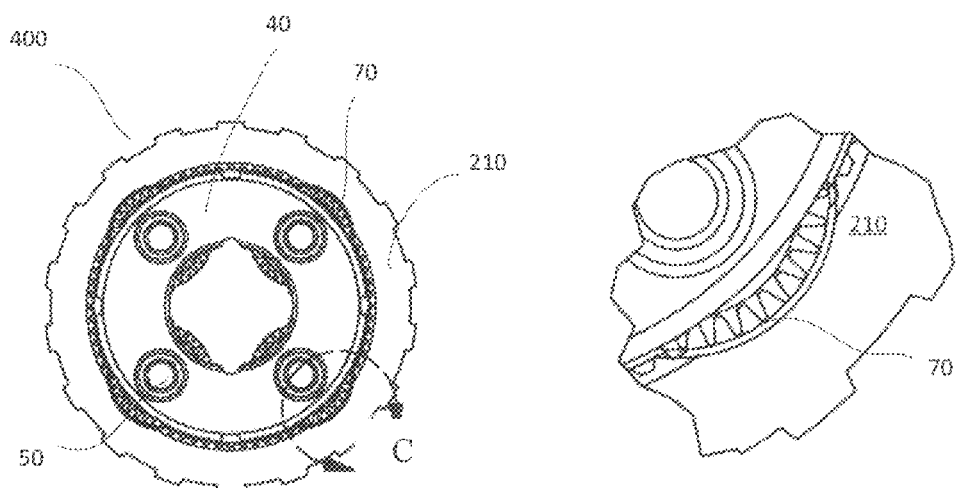
FIG. 6A
DETAIL C
FIG. 6B

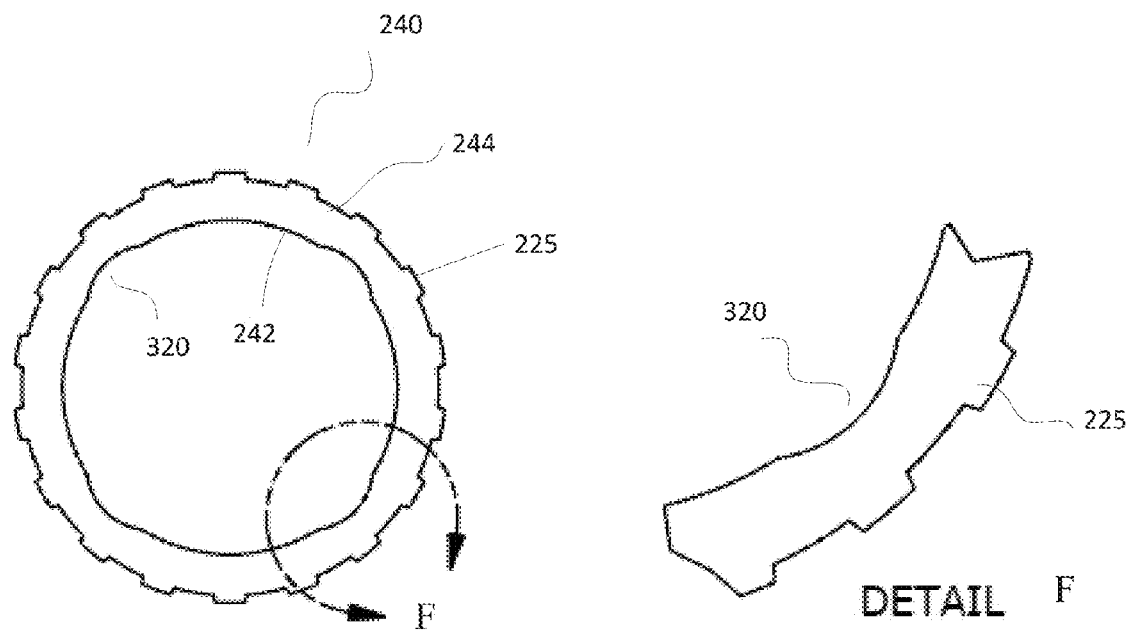
FIG. 9A
FIG. 9B
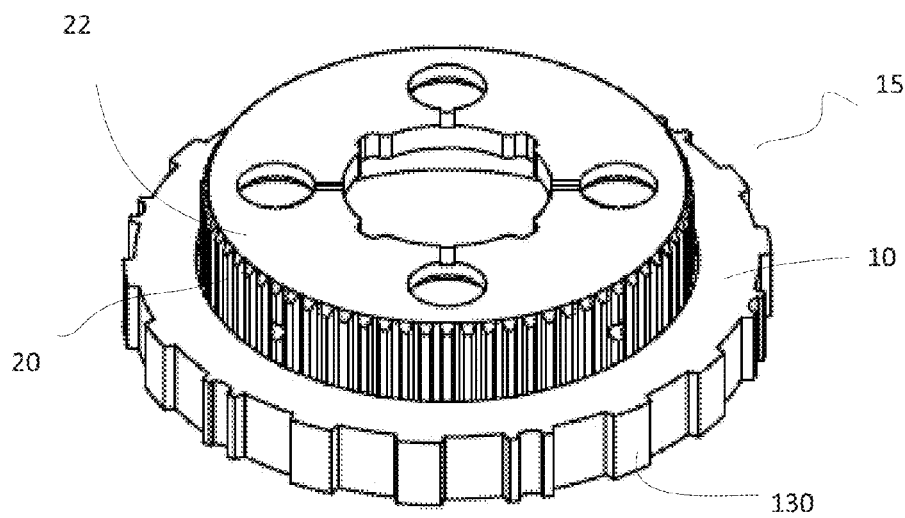
FIG. 10

PLANETARY ASSEMBLY WITH A CAPTIVE CLUTCH

PRIORITY STATEMENT & CROSS-REFERENCE TO RELATED APPLICATIONS

This application claims the benefit of U.S. Provisional Patent Application No. 62/095,606, entitled "Planetary Assembly with a Captive Clutch" and filed on Dec. 22, 2014, in the names of Brad Schlamp and Blair Sware; which is hereby incorporated by reference in its entirety.

TECHNICAL FIELD OF THE INVENTION

The invention relates to gears for automobiles, and more particularly to planetary assemblies used in automatic vehicle gear systems.

BACKGROUND OF THE INVENTION

Planetary gears are commonly used in automatic vehicle transmissions. A challenge with planetary assemblies with captive clutches is that is that the clutch assembly cannot be serviced without disassembling the planetary assembly. Therefore when a component fails, typically the entire planetary assembly must be replaced, at significant expense.

What is needed is a planetary assembly in which the friction clutch can be easily removed and replaced without difficulty and while maintaining the rest of the planetary assembly.

FIGS. 1 through 4 display a planetary assembly as commonly found in the prior art. FIG. 1 displays planetary housing 30, including bottom plate 15 having diode 10, which serves as the bottom of the assembly. A plurality of teeth 20 are elevated from diode 10 and extend circumferentially from elevated portion 22. Top portion 40 of planetary housing 30 includes apertures 50 for receiving pins 60 (as shown in FIG. 13), to rotate planetary gears 70. Elevation members 80 elevate apertures 50 above bottom plate 15.

FIGS. 4A, 4B and 4C shows pressure plate 90, steel disc 100 and friction disc 110, respectively. Circumferentially extending splines 120, 125 on steel disc 100 and pressure plate 90, respectively extend outwardly and are alignable with splines 130 on bottom plate 15. Friction disc 110 includes a plurality of circumferentially internally extending teeth 140 to mate with teeth 20 on bottom plate 15 and thereby prevent rotation of friction disc 110 when placed around diode 10.

FIGS. 2A and 2B show assembled housing 30. Pressure plate 90 rests on top of alternating layers (in pairs) of steel disc 100 and friction disc 110.

As can be seen from FIGS. 2A and 2B, and FIGS. 3A and 3B, when a single steel disc 100, friction disc 110 or pressure plate 90 needs to be replaced, the entire assembly 30 must be entirely disassembled, removed or destroyed, as gears 70 prevent the removal of single steel disc 100, friction disc 110 or pressure plate 90, and typically the entire assembly 30 is simply replaced at significant expense.

SUMMARY OF THE INVENTION

A planetary assembly, including a base and a top portion supporting a plurality of planetary gears, said gears extending outwardly over a portion of the base; one or more pairs of alternating steel discs and friction discs extending upwardly on the base below the plurality of gears; wherein each of the steel discs and friction discs have a plurality of indentations corresponding to the plurality of gears, the indentations aligned and sized to allow movement of the steel discs and friction discs above the plurality of gears.

The planetary assembly may include a pressure plate positioned above the steel discs and friction discs and below the plurality of gears, the pressure plate having a plurality of indentations corresponding to the plurality of gears, the indentations aligned and sized to allow movement of the pressure plate above the plurality of gears.

A planetary assembly is provided, including: a base and a top portion supporting a plurality of planetary gears, said gears extending outwardly over a portion of the base; one or more pairs of alternating steel discs and friction discs positioned on the base below the plurality of gears; wherein each of the steel discs and friction discs have a plurality of indentations corresponding to the plurality of gears, the indentations aligned and sized to allow movement of the steel discs and friction discs above the plurality of gears.

The planetary assembly may include a pressure plate positioned above the steel discs and friction discs and below the plurality of gears, the pressure plate having a plurality of indentations corresponding to the plurality of gears, the indentations aligned and sized to allow movement of the pressure plate above the plurality of gears.

The planetary assembly may include a bottom plate, the bottom plate having a diode and an elevated portion, the elevated portion having a plurality of outwardly extending teeth configured to mesh with a plurality of teeth extending inwardly from at least one of the plurality of friction discs.

The planetary assembly may further include a plurality of apertures in the top portion, each of apertures corresponding to a gear of the plurality of gears, each aperture configured to receive a pin to position the gear. The plurality of gears may include three or more gears. Each of the steel discs may include a plurality of outwardly extending splines positioned to align with the outwardly extending splines of the diode. The pressure plate may include a plurality of outwardly extending splines positioned to align with the plurality of outwardly extending splines of both the diode and the plurality of steel discs.

A planetary assembly is provide, including: a base and a top portion supporting a plurality of planetary gears, said gears extending outwardly over a portion of the base; one or more pairs of alternating steel discs and friction discs positioned on the base below the plurality of gears; and wherein each of the plurality of friction discs has a plurality of indentations, each indentation corresponding to a gear of the plurality of gears, the indentations aligned and sized to allow movement of the friction disc above the plurality of gears.

BRIEF DESCRIPTION OF THE DRAWINGS

FIG. 1 is a perspective view of a partially completed prior art planetary assembly according to the prior art.

FIG. 2A is a perspective view of a prior art planetary assembly and FIG. 2B is a detail view of a portion A thereof.

FIG. 3 is a top view of a prior art planetary assembly.

FIG. 3B is a detail view of a portion B thereof.

FIG. 4A is a perspective view of a pressure plate for a prior art planetary assembly.

FIG. 4B is a perspective views of a steel disc for a prior art planetary assembly.

FIG. 4C is a perspective view of a friction disc for a prior art planetary assembly.

FIGS. 5 is a perspective view of an embodiment of a planetary assembly according to the invention.

FIGS. 6A is a top view of an embodiment of a planetary assembly according to the invention.

FIG. 6B is a detail view of portion C thereof.

FIG. 9A and 9B respective top views of an embodiment of a steel disc according to the invention and a detail view of portion F thereof.

FIG. 10 is a perspective view of a bottom plate for use with a planetary assembly according to the invention.

DETAILED DESCRIPTION OF THE INVENTION

Figures 7A, 7B:
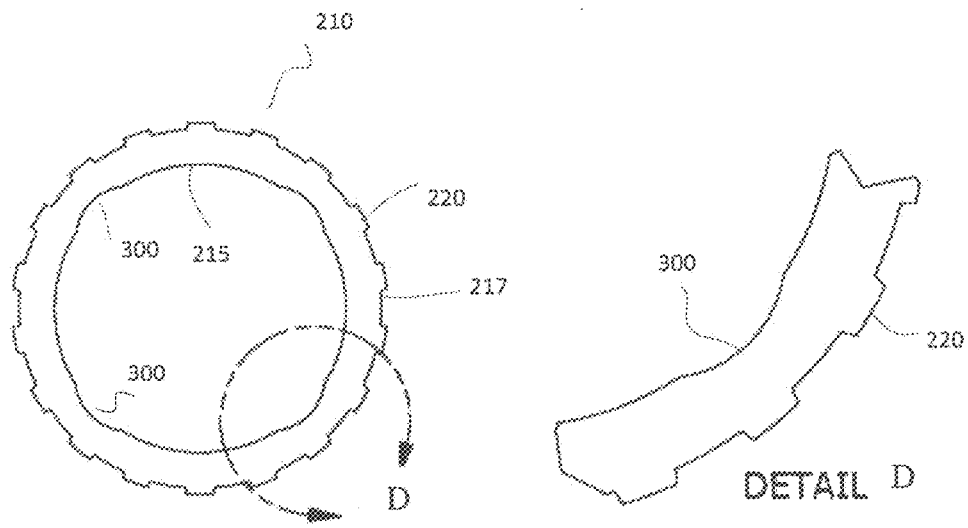
FIGS. 7A and 7B are respective top views of an embodiment of a pressure plate according to the invention and a detail view of a portion D thereof.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

As shown in FIGS. 5 through 12, the planetary assembly 400 according to the invention includes indentations on various components to allow removal of these components without impacting planetary gears 70.

Figure 13:
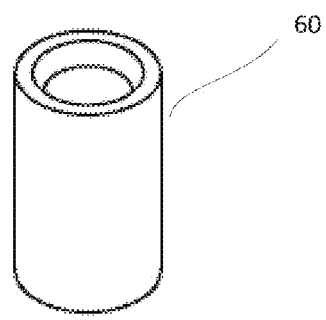
FIG. 13 is a perspective view of an embodiment of a pin for a pinion gear.

FIGS. 5, 6A and 6B show the completed planetary assembly 400 according to the invention. Planetary assembly 400 includes bottom plate 15 having diode 10, which serves as the bottom of assembly 400. A plurality of outwardly extending splines 20 are elevated from diode 10 and extend circumferentially from elevated portion 22. Top portion 40 of planetary housing 400 includes apertures 50 for receiving pins (as shown in FIG. 13), to rotate planetary gears 70. While four gears 70 are shown, there may be three or more gears 70 included. Elevation members 80 elevate apertures 50 above bottom plate 15. Gears 70 extend past the circumference of elevated portion 22 and top portion 40 to allow gears 70 to engage.

FIGS. 7A and 7B show an embodiment of pressure plate 210 according to the invention. Pressure plate 210 is generally ring shaped, having inner edge 215 and outer edge 217, and includes on outer edge 217 outward splines 220 alignable with outward splines 225, 130 on steel disc 240 and bottom plate 15, respectively. Indentations 300 extending outwardly from inner edge 215 are sized to partially surround with minimal clearance, for example, at a distance of a few millimetres, but not contact, gears 70 when pressure plate 210 is in position.

Figures 8A, 8B:
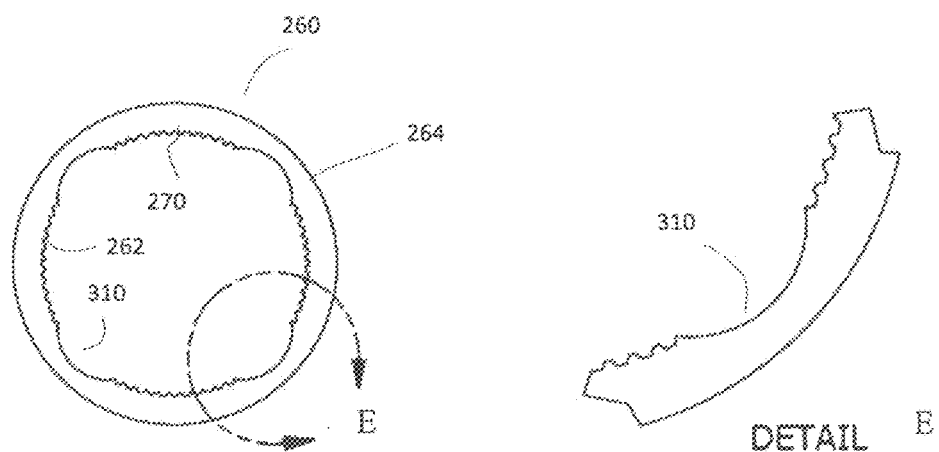
FIG. 8A and 8B are respective top views of an embodiment of a friction disc according to the invention and a detail view of a portion E thereof.

FIGS. 8A and 8B show an embodiment of friction disc 260 according to the invention. Friction disc 260 is generally ring shaped, having inner edge 262 and outer edge 264, and includes on inner edge 262 internal teeth 270 configured to mesh with teeth 20 on bottom plate 15. Friction disc 260 also includes indentations 310 extending outwardly from inner edge 262 alignable with indentations 300 and 325.

FIGS. 9 and 9B show an embodiment of steel disc 240 according to the invention. Steel disc 240 is generally ring shaped, having inner edge 242 and outer edge 244, and includes on outer edge 244 outward splines 225 alignable with outward splines 220, 130 on pressure plate 210 and bottom plate 15, respectively. Steel disc 240 also includes indentations 320 extending outwardly from inner edge 242 alignable with indentations 300 and 310.

When steel disc 240, friction disc 260 and pressure plate 210 are positioned, indentations 320, 310 and 300 are aligned, as are outward splines 220, 225 and 130. The alignment of indentations 300, 310 and 320 allow pressure plate 210, friction discs 260 and steel discs 240 to be removable without difficulty whereby they can be individually replaced if needed.

FIG. 10 shows bottom plate 15. Including lower splines 130 alignable with splines 225, 220 and 130, and teeth 20 to mesh with internal teeth 140. Teeth 20 are elevated from diode 10. Bottom plate 15 includes diode 10, which serves as the bottom of the assembly.

Figure 11:
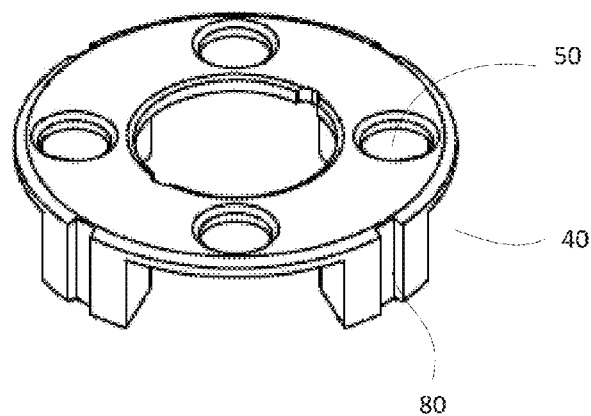
FIG. 11 is a perspective view of a top plate for a planetary assembly.
Figure 12:
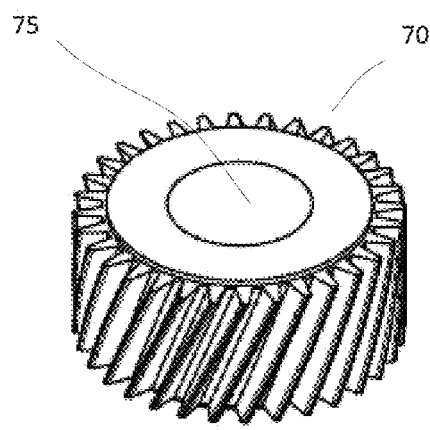
FIGS. 12 is a perspective view of an embodiment of a pinion gear for a planetary assembly.

FIG. 11 shows top portion 40 shows top portion 40 of planetary housing 30 including apertures 50 for receiving pins 60 to rotate planetary gears 70. Elevation members 80 elevate apertures 50 above bottom plate 15. FIG. 12 shows a planetary gear 70 alignable with aperture 50 with pin 60 (as shown in FIG. 13) sized to pass through the center 75 aperture of gear 70.

Indentations 300, 310 and 320 may be identically shaped and formed as a semicircle extending outwardly from the inside circumference edge of pressure plate 210, frictions discs 260 and steel discs 240, respectively. Indentations 300, 310, and 320 may have a radius minimally larger than that of gear 70 to allow removal of gear 70 to access a damaged or worn pressure plate 210, friction disc 260 or steel disc 240. Each of pressure plate 210, friction disc 260, and steel disc 240 should have an indentation 300, 310 or 320 respectively, to correspond to each gear 70. Alternatively, instead of being semicircles, indentations 300, 310 or 320 may have different shapes, such as rectangular or even an irregular shape, so long as they allow clearance by gears 70.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

What is claimed is:

1. A planetary assembly, comprising:
a base and a top portion supporting a plurality of planetary gears, at least one gear of the plurality of gears extending outwardly over a portion of the base;
one or more pairs of alternating steel discs and friction discs positioned on the base below the plurality of gears;
wherein each of the steel discs and friction discs have a plurality of indentations corresponding to the plurality of gears, the indentations aligned and sized to allow movement of the steel discs and friction discs above the at least one gear of the plurality of gears.

2. The planetary assembly of claim 1 further comprising a pressure plate positioned above the steel discs and friction discs and below the plurality of gears, the pressure plate having a plurality of indentations corresponding to the plurality of gears, the indentations aligned and sized to allow movement of the pressure plate above the at least one gear of the plurality of gears.

3. The planetary assembly of claim 2 further comprising a bottom plate, the bottom plate having a diode and an elevated portion, the elevated portion having a plurality of outwardly extending teeth configured to mesh with a plurality of teeth extending inwardly from at least one of the plurality of friction discs.

4. The planetary assembly of claim 1 further comprising a plurality of apertures in the top portion, each of aperture corresponding to a gear of the plurality of gears, each aperture configured to receive a pin to position the gear.

5. The planetary assembly of claim 1 wherein the plurality of gears comprises three or more gears.

6. The planetary assembly of claim 3 wherein each of the steel discs comprises a plurality of outwardly extending splines positioned to align with the outwardly extending splines of the diode.

7. The planetary assembly of claim 2 where the pressure plate comprises a plurality of outwardly extending splines positioned to align with the plurality of outwardly extending splines of both the diode and the plurality of steel discs.

8. A planetary assembly, comprising:
a base and a top portion supporting a plurality of planetary gears, each of said gears extending outwardly over a portion of the base;
one or more pairs of alternating steel discs and friction discs positioned on the base below the plurality of gears;
wherein each of the plurality of friction discs has a plurality of indentations, each indentation corresponding to a gear of the plurality of gears, the indentations aligned and sized to allow movement of the friction disc above the plurality of gears.

* * * * *